US007103937B2

(12) United States Patent
Weng

(10) Patent No.: US 7,103,937 B2
(45) Date of Patent: Sep. 12, 2006

(54) AXLE POSITIONING STRUCTURE

(75) Inventor: Shih-Lung Weng, Kaohsiung (TW)

(73) Assignee: Benq Corporation, Taoyuan Shien (TW)

(*) Notice: Subject to any disclaimer, the term of this patent is extended or adjusted under 35 U.S.C. 154(b) by 90 days.

(21) Appl. No.: 10/884,893

(22) Filed: Jul. 6, 2004

(65) Prior Publication Data

US 2005/0005396 A1 Jan. 13, 2005

(30) Foreign Application Priority Data

Jul. 10, 2003 (TW) .............................. 92118925 A

(51) Int. Cl.
*E05D 11/08* (2006.01)

(52) U.S. Cl. ............................ 16/273; 16/342; 16/337; 16/54

(58) Field of Classification Search .................. 16/342, 16/337, 273, 51, 50, 54; 361/680–683; 455/575.1, 455/575.4, 575.8, 550.1, 90.3; 379/433.12, 379/433.13; 188/129; 267/196, 134, 214
See application file for complete search history.

(56) References Cited

U.S. PATENT DOCUMENTS

| | | | | |
|---|---|---|---|---|
| 2,672,764 | A * | 3/1954 | Bedford, Jr. | 74/503 |
| 3,843,188 | A * | 10/1974 | Kirschner | 295/7 |
| 4,571,773 | A * | 2/1986 | Yuda | 16/85 |
| 4,807,330 | A * | 2/1989 | Gomes | 16/261 |
| 5,257,680 | A * | 11/1993 | Corcoran et al. | 188/129 |
| 5,333,356 | A * | 8/1994 | Katagiri | 16/340 |
| 5,460,248 | A * | 10/1995 | Korb et al. | 188/130 |
| 5,715,575 | A * | 2/1998 | Kubota | 16/342 |
| 5,832,566 | A * | 11/1998 | Quek et al. | 16/342 |
| 5,894,635 | A * | 4/1999 | Lu | 16/342 |
| 6,119,310 | A * | 9/2000 | Ohshima et al. | 16/342 |
| 6,264,392 | B1 * | 7/2001 | Wise et al. | 403/112 |
| 6,317,927 | B1 * | 11/2001 | Lai et al. | 16/342 |
| 6,381,808 | B1 * | 5/2002 | Kida | 16/340 |
| 6,386,528 | B1 * | 5/2002 | Thorn et al. | 267/201 |
| 6,408,485 | B1 * | 6/2002 | Wu | 16/342 |
| 2004/0261225 | A1 * | 12/2004 | Bassi | 16/342 |
| 2005/0207104 | A1 * | 9/2005 | Love | 361/683 |

FOREIGN PATENT DOCUMENTS

| | | | |
|---|---|---|---|
| DE | 2534024 | A * | 2/1976 |
| DE | 19954667 | A1 * | 5/2001 |
| GB | 1404765 | A * | 9/1975 |
| GB | 2286011 | A * | 8/1995 |
| TW | 530962 | | 5/2003 |

* cited by examiner

*Primary Examiner*—Chuck Y. Mah
(74) *Attorney, Agent, or Firm*—Thomas, Kayden, Horstemeyer & Risley

(57) ABSTRACT

An axle positioning structure includes a sleeve, a shaft, and an elastomer. The sleeve includes a bottom and an inner wall. The bottom and the inner wall form a receiving space. The shaft is rotatably coupled to the sleeve. The first end of the shaft goes through the hole of the bottom, and the second end of the shaft is disposed within the receiving space. The elastomer is connected to the second end of the shaft for holding the sleeve by stretching onto the inner wall of the sleeve, so that the shaft is positioned after rotating a determined angle relative to the sleeve.

27 Claims, 3 Drawing Sheets

308 300 312 304 330 306 100 312 302 310 304 320

AXLE POSITIONING STRUCTURE

This application claims the benefit of Taiwan application Serial No. 092118925, filed Jul. 10, 2003, the subject matter of which is incorporated herein by reference.

BACKGROUND OF THE INVENTION

1. Field of the Invention

The invention relates in general to an axle structure, and more particularly to an axle positioning structure employed in lightweight devices.

2. Description of the Related Art

Digital cameras offer considerable advantages over conventional film-type cameras in that the digital image data may be stored, processed, and/or reproduced with ease. The relative ease of handling and processing the digital image data produced by digital cameras allows users to readily look and examine the outcome of digital images.

With the advanced development of 3 C (consuming electronics product, computer and communication) industries, the current manufactures tend to install a built-in digital camera in various portable devices such as notebook computers, mobile phones, personal digital assistants (PDAs), and so on. Take the portable device with a flip cover device (hereinafter referred to as a clam-shaped device) as the example, a built-in digital camera is mainly installed in the rotating axle pivotally connecting the cover and the main body of the clam-shaped device, or otherwise the built-in digital camera is installed in the forward part of the cover. FIGS. 1A to 1C are lateral views showing a clam-shaped device equipped with a built-in digital camera. The clam-shaped device includes a cover 110, a main body 120 and a rotating -axle 130. The rotating axle 130 connects the cover 110 and the main body 120, so that the cover 110 can pivotally rotate relative to the main body 120 to allow the clam-shaped device to be opened or closed. A digital camera 100 is rotatably coupled to the forward part of the cover 110 through an axle 104 so that the lens 102 of the digital camera 100 can change the angle of view to enlarge the field of vision by rotating the axle 104.

In the beginning, before the digital camera 100 rotates with respect to the cover 110, the rotating angle is zero degree, as shown in FIG. 1A. FIG. 1B appears the digital camera 100 rotating 90 degrees with respect to the cover 110. The digital camera 100 rotates the ultimate rotating angle is 180 degree with respect to the cover 110, as shown in FIG. 1C. Users can rotate the lens 102 of the digital camera 100 with adjustable 0–180 degrees by rotating the axle 104 to capture the shot.

Conventionally, in order to allow the axle 104 to have a positioning function, a small-scale hinge mechanism is employed so that the digital camera 100 can be fixed after rotating a determined angle between 0–180 degrees. However, it is not necessary to use the small-scale hinge mechanism here due to the light weight of the digital camera 100 so that the torsion required for the digital camera 100 is less than that the small-scale hinge mechanism offers. Besides, the outer diameter of the axle 104 can be allowed within 4 mm. Moreover, considering the higher production cost and the lower manufacture yield rate, it is not applicable when the hinge mechanism is employed in being the axle 104 of a clam-shaped device such as the digital camera 100.

FIG. 2 is a cross-sectional view showing the structure of a conventional axle. The axle 104 includes a sleeve 200 and a shaft 210; the shaft 210 is rotatably coupled to the sleeve 200. The bottom 202 and the inner wall 204 of the sleeve 200 form a receiving space 206, and the bottom 202 of the sleeve 200 has a hole 208. The first end of the shaft 210 goes through the hole 208 and then is fixed to the digital camera 100. The second end of the shaft 210 is disposed within the receiving space 206 of the sleeve 200. Besides, the shaft 210 has a stopper 212 protruding from the second end of the shaft 210 for stopping the shaft 210 from axially moving so as to prevent the shaft 210 from slipping out of the receiving space 206 through the hole 208.

In FIG. 2, the shaft 210 can be positioned by a design analogous to wedging the shaft 210 into the sleeve 200. However, the coupling portion of the shaft 210 and the sleeve 200 is suffered a lot of wear and tear after repeatedly rotating. The analogous wedging design consequently becomes loosening so that the digital camera 100 cannot be positioned at a determined angle to meet users' needs.

SUMMARY OF THE INVENTION

In view of the foregoing, it is an object of the present invention to provide an improved axle positioning structure. This particular simplified structure not only enables the axle to have the function of positioning, but also lowers the degree of the wear and tear of the axle.

The invention achieves the above-identified object by providing an axle positioning structure including a sleeve, a shaft and an elastomer. The sleeve includes a bottom and an inner wall, wherein the bottom and the inner wall form a receiving space. The shaft is rotatably coupled to the sleeve, wherein the first end of the shaft goes through the hole of the bottom, and the second end of the shaft is disposed within the receiving space. The elastomer is connected to the second end of the shaft, wherein the elastomer is used for holding the sleeve by stretching onto the inner wall of the sleeve, so that the shaft is positioned after rotating a determined angle relative to the sleeve.

It is another object of the invention to provide an axle positioning structure for rotatably positioning a first device within a second device. The axle positioning structure includes a sleeve, a shaft and an elastomer. The sleeve is disposed in the second device and the shaft is rotatably coupled to the sleeve. Then, the first end of the shaft is immovably installed in the first device for directing the first device to rotate a determined angle relative to the sleeve. The elastomer is disposed within the sleeve and the elastomer is connected to the second end of the shaft for holding the sleeve by stretching onto the inner wall of the sleeve, so that the first device is positioned at the determined angle.

Other objects, features, and advantages of the invention will become apparent from the following detailed description of the preferred but non-limiting embodiments. The following description is made with reference to the accompanying drawings.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like components throughout.

The present invention aims to provide an axle positioning structure enabling to rotatably fix a lightweight device to a portable device rather than using the small-scale hinge mechanism. Moreover, the present invention can replace the small-scale hinge mechanism and prevent the wear and tear of the axle positioning structure after repeatedly rotating to maintain the functions of positioning well.

The axle positioning structure of the present invention is applied for rotatably positioning a first device in a second device. The axle positioning structure is suitable for being equipped when the first device is a lightweight device such as a digital camera, so that the torsion required for the digital camera 100 is less. The second device is preferred a portable device with a built-in digital camera, such as a notebook computer, mobile phone, or personal digital assistant (PDA). The built-in digital camera is rotatably coupled to the forward part of the LCD module (Liquid crystal display module) of the second device, so that the lens of the digital camera can change the angle of view to enlarge the field of vision by rotating the axle positioning structure.

Figures 1A, 1B, 1C:
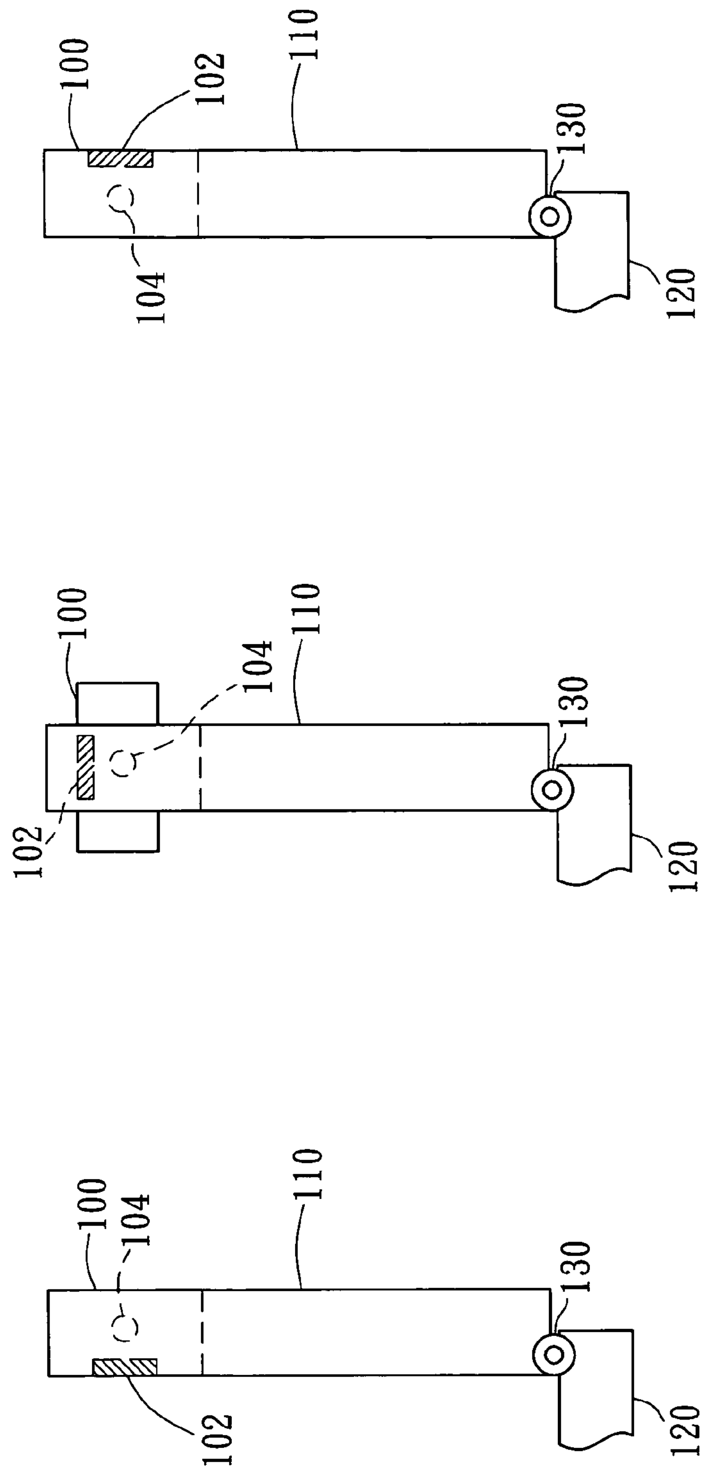
FIGS. 1A to 1C (Prior Art) are lateral views showing a clam-shaped device equipped with an built-in digital camera.
Figure 2:
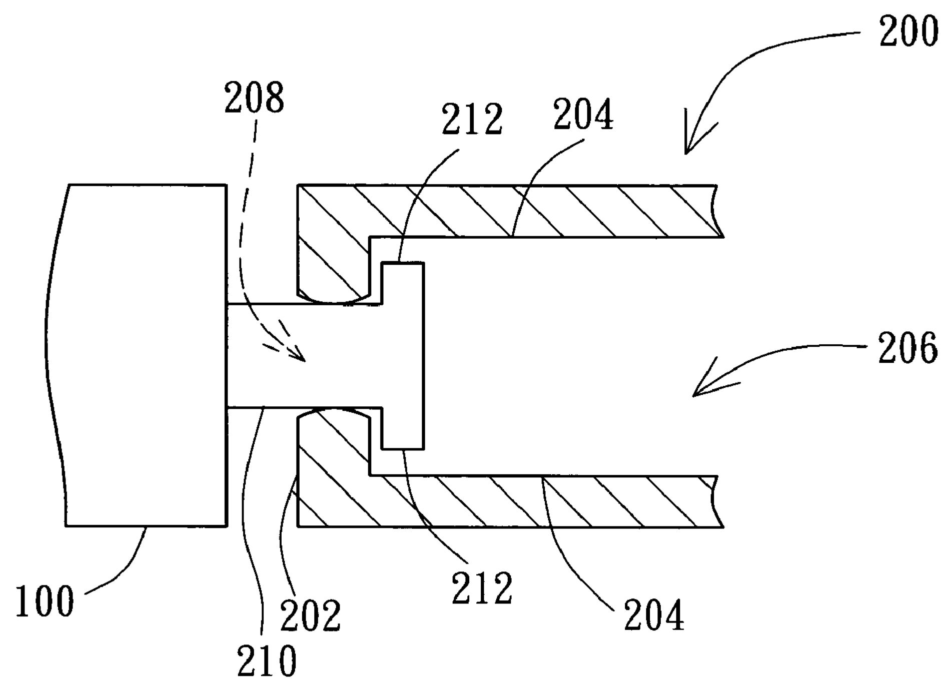
FIG. 2 (Prior Art) is a cross-sectional view showing the structure of a conventional axle.
Figure 3:
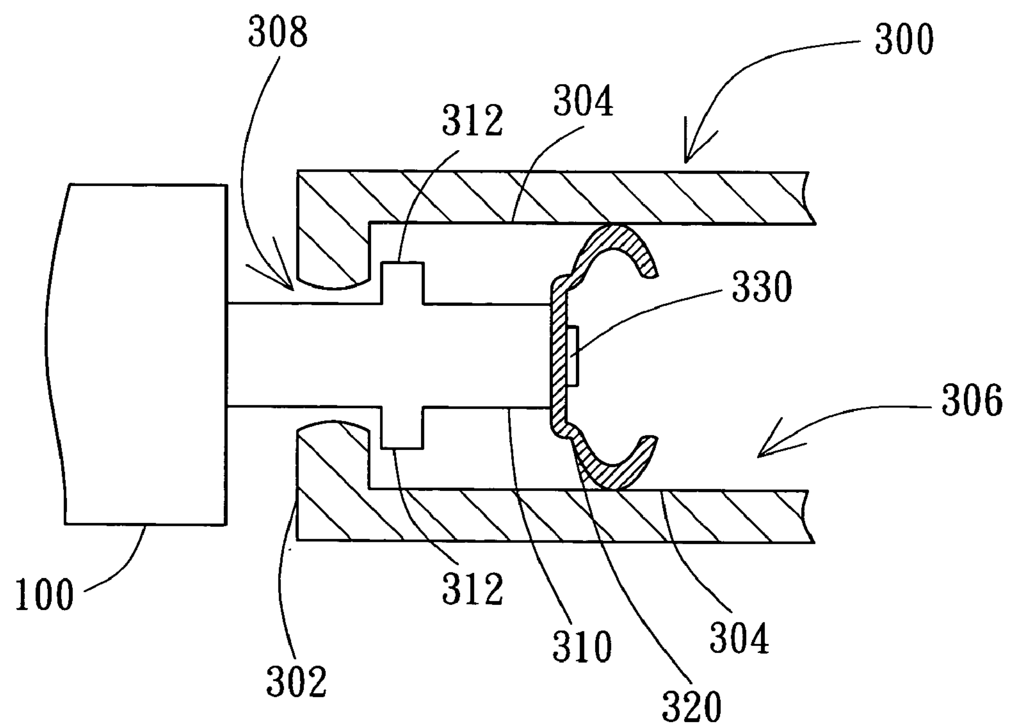
FIG. 3 is a schematic diagram illustrating an axle positioning structure according to the present invention.

FIG. 3 is a schematic diagram illustrating the axle positioning structure according to the present invention. Referring to FIG. 3, the axle positioning structure includes a sleeve 300, a shaft 310 and an elastomer 320. The sleeve 300 is disposed in the second device and the sleeve 300 is rotatably coupled to the shaft 310. The sleeve 300 includes a bottom 302 and an inner wall 304; the bottom 302 and the inner wall 304 then form a receiving space 306. The bottom 302 has a hole 308 so that the first end of the shaft 310 goes through the hole 308 and then the first end of the shaft is immovably installed in the first device. The second end of the shaft 310 is disposed within the receiving space 306 of the sleeve 300. Therefore, the shaft 310 is able to direct the first device to rotate a determined angle relative to the sleeve 300. Moreover, the axle positioning structure further includes a stopper 312 protruding from the shaft 310 for stopping the shaft 310 from axially moving so as to prevent the shaft 310 from slipping out of the receiving space 306 through the hole 308. The elastomer 320 is disposed within the sleeve 300 and the elastomer 320 is connected firm to the second end of the shaft 310. The elastomer 320 can be fixed to the second end of the shaft 310 by a screw 330, or another fastening device such as a wedge, which functions to connect and screw the elastomer 320 to the second end of the shaft 310.

When the sleeve 300 is coupled with the shaft 310, the elastomer 320 is used for holding the sleeve by stretching onto the inner wall 304 of the sleeve 300, so that the first device can be positioned at the determined angle after the shaft 310 is directing the first device to rotate a determined angle relative to the sleeve 300. Moreover, the elasticity of the elastomer 320 can lower the degree of the wear and tear between the elastomer 320 and the inner wall 304 of the sleeve 300 when the shaft 310 is directing the first device to rotate relative to the sleeve 300. The elasticity of the elastomer 320 allows the elastomer 320 to maintain holding the sleeve by stretching onto the inner wall 304 of the sleeve 300 after continually rotating, so that the first device can be positioned relative to the second device.

Figure 4:
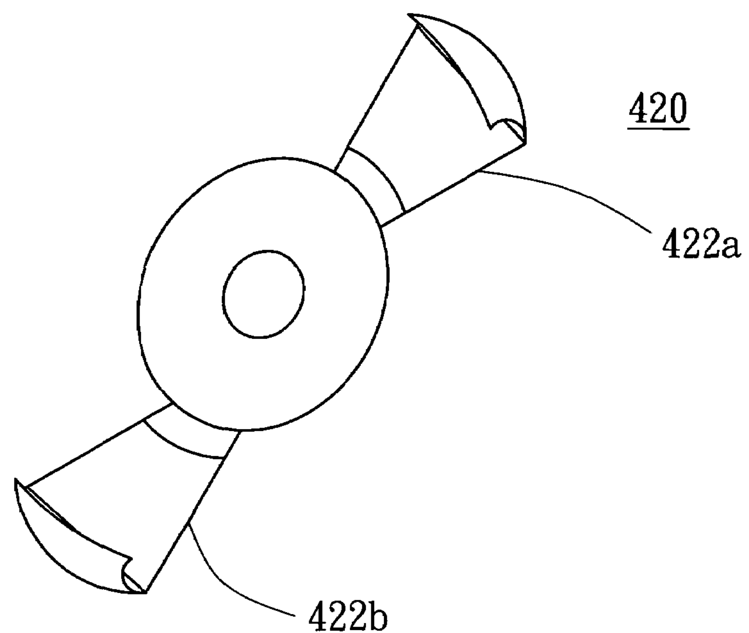
FIG. 4 and FIG. 5 are two perspective views showing the elastomers of the axle positioning structure in FIG. 3.
Figure 5:
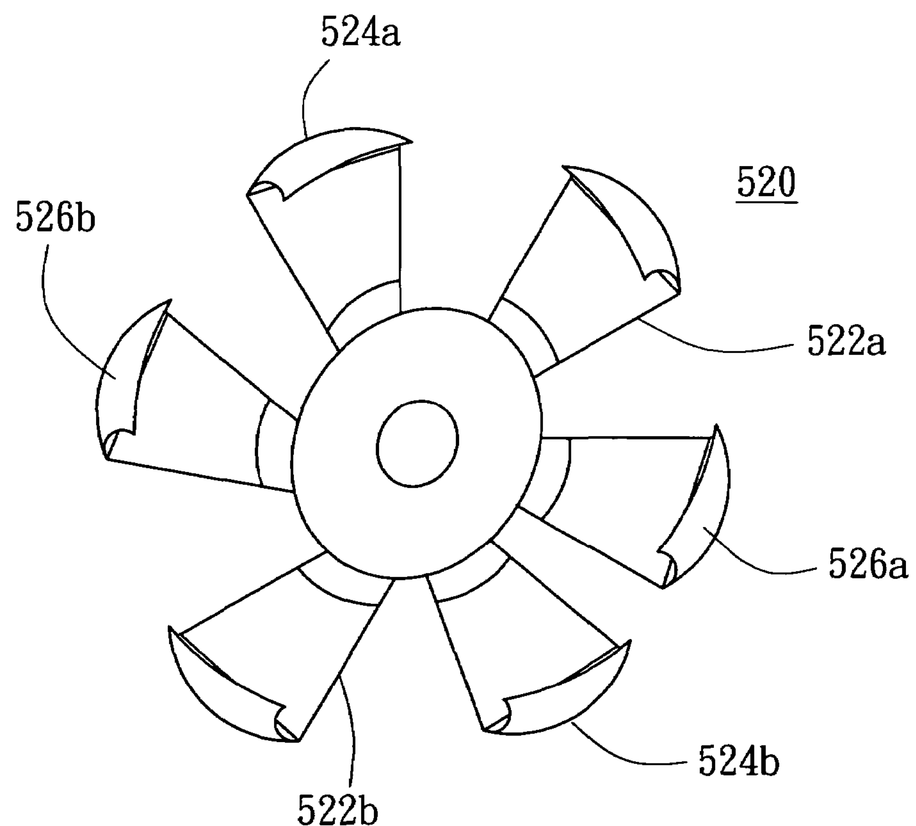

FIG. 4 and FIG. 5 are two perspective views showing the elastomer of the axle positioning structure in FIG. 3. In FIG. 4, the double spring strips elastomer 420 includes two spring strips 422*a* and 422*b*. The spring strips 422*a* and 422*b* are connected with the center of the elastomer 420 and are oppositely disposed and arranged in a line. In FIG. 5, the multiple spring strips elastomer 520 includes numbers of spring strips, such as six spring strips 522*a*, 522*b*, 524*a*, 524*b*, 526*a*, and 526*b*. The six spring strips 522*a*, 522*b*, 524*a*, 524*b*, 526*a*, and 526*b* are surrounded the center of the elastomer 520 and are radially arranged in a circle. Each two of the spring strips 522*a* and 522*b*, 524*a* and 524*b*, 526*a* and 526*b*, are particularly oppositely disposed in a line respectively. The number and the disposition of the spring strips are adjustable according to the cross-sectional shape of the sleeve 300. For example, when the cross-sectional shape of the sleeve 300 is a round shape, an elastomer including double spring strips, or a single spring strip elastomer including only one long spring strip, is able to meet users' needs. The structure of the single spring strip elastomer is similar to the structure of the double spring strips elastomer 420, wherein the middle of the single spring strip elastomer is connected to the second end of the shaft 310. Otherwise, the multiple spring strips elastomer is able to meet users' needs and is suitable for the sleeve 300 with a round cross-section or any other non-circular shaped cross-sections.

As described hereinbefore, by employing the axle positioning structure according to the preferred embodiment of the present invention, the axle positioning structure can rotatably fix a lightweight device to a portable device rather than using the small-scale hinge mechanism. Moreover, the present invention can replace the small-scale hinge mechanism and prevent the wear and tear of the axle positioning structure after repeatedly rotating so as to maintain the positioning function well.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An axle positioning structure, comprising:

a sleeve which includes:

- a bottom having a hole; and
- an inner wall, wherein the bottom and the inner wall form a receiving space;

a shaft which is rotatably coupled to the sleeve, wherein a first end of the shaft goes through the hole of the bottom, and a second end of the shaft is disposed within the receiving space; and an elastomer having two ends, one of which is connected to the second end of the shaft and the other of which is protruding along a direction away from the bottom, wherein the elastomer is used for holding the sleeve by the other end stretching onto an inner wall of the sleeve, so that the shaft is positioned after rotating a determined angle relative to the sleeve, wherein the elastomer comprises at least two spring strips and the two spring strips are oppositely disposed and arranged in a line.

2. The axle positioning structure according to claim 1, wherein the axle positioning structure further comprises a stopper protruding from the first end of the shaft in the receiving space and contactable with the bottom, for stopping the shaft from axially moving out of the sleeve through the hole.

3. An axle positioning structure, comprising:

a sleeve which includes:

a bottom having a hole; and an inner wall, wherein the bottom and the inner wall form a receiving space;

a shaft which is rotatably coupled to the sleeve, wherein a first end of the shaft goes through the hole of the bottom, and a second end of the shaft is disposed within the receiving space; and an elastomer having two ends, one of which is connected to the second end of the shaft and the other of which is protruding along a direction away from the bottom, wherein the elastomer is used for holding the sleeve by the other end stretching onto an inner wall of the sleeve, so that the shaft is positioned after rotating a determined angle relative to the sleeve, wherein the elastomer further comprises a plurality of spring strips and the spring strips are radially arranged in a circle.

4. The axle positioning structure according to claim 3, wherein the axle positioning structure further comprises a stopper protruding from the first end of the shaft in the receiving space and contactable with the bottom, for stopping the shaft from axially moving out of the sleeve through the hole.

5. An axle positioning structure, comprising:

a sleeve which includes:

a bottom having a hole; and an inner wall, wherein the bottom and the inner wall form a receiving space;

a shaft which is rotatably coupled to the sleeve, wherein a first end of the shaft goes through the hole of the bottom, and a second end of the shaft is disposed within the receiving space; and an elastomer having two ends, one of which is connected to the second end of the shaft and the other of which is protruding along a direction away from the bottom, wherein the elastomer is used for holding the sleeve by the other end stretching onto an inner wall of the sleeve, so that the shaft is positioned after rotating a determined angle relative to the sleeve, wherein the axle positioning structure further comprises a screw for fixing the elastomer to the second end of the shaft.

6. The axle positioning structure according to claim 5, wherein the axle positioning structure further comprises a stopper protruding from the first end of the shaft in the receiving space and contactable with the bottom, for stopping the shaft from axially moving out of the sleeve through the hole.

7. An axle positioning structure for rotatably positioning a first device within a second device, the axle positioning structure comprising:

a sleeve disposed in the second device and comprising a bottom;

a shaft rotatably coupled to the sleeve, wherein a first end of the shaft is fixed to the first device for directing the first device to rotate a determined angle relative to the sleeve; and an elastomer disposed within the sleeve, wherein the elastomer having two ends, one of which is connected to a second end of the shaft and the other of which is protruding along a direction away from the bottom for holding the sleeve, so that the first device is positioned at the determined angle, wherein the elastomer comprises two spring strips and the two spring strips are arranged in a line.

8. The axle positioning structure according to claim 7, wherein the bottom has a hole and the sleeve further comprises:

an inner wall, wherein the bottom and the inner wall form a receiving space.

9. The axle positioning structure according to claim 8, wherein the first end of the shaft goes through the hole of the bottom to be fixed to the first device.

10. The axle positioning structure according to claim 9, wherein the second end of the shaft is disposed within the receiving space.

11. The axle positioning structure according to claim 9, wherein the elastomer is used for holding the sleeve by the other end stretching onto the inner wall of the sleeve, thereby positioning the first device.

12. The axle positioning structure according to claim 9, wherein the axle positioning structure further comprises a stopper protruding from the first end of the shaft in the receiving space and contactable with the bottom, for stopping the shaft from axially moving out of the sleeve through the hole.

13. The axle positioning structure according to claim 7, wherein the first device is a digital camera.

14. An axle positioning structure for rotatably positioning a first device within a second device, the axle positioning structure comprising:

a sleeve disposed in the second device and comprising a bottom;

a shaft rotatably coupled to the sleeve, wherein a first end of the shaft is fixed to the first device for directing the first device to rotate a determined angle relative to the sleeve; and an elastomer disposed within the sleeve, wherein the elastomer having two ends, one of which is connected to a second end of the shaft and the other of which is protruding along a direction away from the bottom for holding the sleeve, so that the first device is positioned at the determined angle, wherein the elastomer comprises a plurality of spring strips and the spring strips are radially arranged in a circle.

15. The axle positioning structure according to claim 14, wherein the bottom has a hole and the sleeve further comprises:

an inner wall, wherein the bottom and the inner wall form a receiving space.

16. The axle positioning structure according to claim 15, wherein the first end of the shaft goes through the hole of the bottom to be fixed to the first device.

17. The axle positioning structure according to claim 16, wherein the second end of the shaft is disposed within the receiving space.

18. The axle positioning structure according to claim 16, wherein the elastomer is used for holding the sleeve by the other end stretching onto the inner wall of the sleeve, thereby positioning the first device.

19. The axle positioning structure according to claim 16, wherein the axle positioning structure further comprises a stopper protruding from the first end of the shaft in the receiving space and contactable with the bottom, for stopping the shaft from axially moving out of the sleeve through the hole.

20. The axle positioning structure according to claim 14, wherein the first device is a digital camera.

21. An axle positioning structure for rotatably positioning a first device within a second device, the axle positioning structure comprising:

a sleeve disposed in the second device and comprising a bottom;

a shaft rotatably coupled to the sleeve, wherein a first end of the shaft is fixed to the first device for directing the first device to rotate a determined angle relative to the sleeve; and an elastomer disposed within the sleeve, wherein the elastomer having two ends, one of which is connected to a second end of the shaft and the other of which is protruding along a direction away from the bottom for holding the sleeve, so that the first device is positioned at the determined angle, wherein the axle positioning structure further comprises a screw for fixing the elastomer to the second end of the shaft.

22. The axle positioning structure according to claim 21, wherein the bottom has a hole and the sleeve further comprises:

an inner wall, wherein the bottom and the inner wall form a receiving space.

23. The axle positioning structure according to claim 22, wherein the first end of the shaft goes through the hole of the bottom to be fixed to the first device.

24. The axle positioning structure according to claim 23, wherein the second end of the shaft is disposed within the receiving space.

25. The axle positioning structure according to claim 23, wherein the elastomer is used for holding the sleeve by the other end stretching onto the inner wall of the sleeve, thereby positioning the first device.

26. The axle positioning structure according to claim 23, wherein the axle positioning structure further comprises a stopper protruding from the first end of the shaft in the receiving space and contactable with the bottom, for stopping the shaft from axially moving out of the sleeve through the hole.

27. The axle positioning structure according to claim 21, wherein the first device is a digital camera.

* * * * *